(12) United States Patent
Rakshit

(10) Patent No.: US 9,557,955 B2
(45) Date of Patent: Jan. 31, 2017

(54) SHARING OF TARGET OBJECTS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 14/283,990

(22) Filed: May 21, 2014

(65) Prior Publication Data
US 2015/0339094 A1 Nov. 26, 2015

(51) Int. Cl.
*G06F 3/048* (2013.01)
*G06F 3/14* (2006.01)
(Continued)

(52) U.S. Cl.
CPC .............. *G06F 3/1454* (2013.01); *G02B 27/01* (2013.01); *G02B 27/017* (2013.01); *G06F 3/14* (2013.01);
(Continued)

(58) Field of Classification Search
CPC ............ G06F 3/00; G06F 3/14; G06F 3/1454; G06F 3/048; G06F 3/0481; G06F 3/0482; G06F 3/0484; G06F 3/04842; G06F 9/4443; G06F 15/00; G09B 9/00; G02B 27/01; G02B 27/017; G02B 2027/0178; G09G 5/00; G09G 5/12; G09G 5/36; G09G 5/377; G09G 2320/10; G09G 2340/0464; G06T 15/00; G06T 19/00; G06K 9/00; G06Q 30/00; G06Q 50/00; G06Q 50/01; A63F 13/00; H04N 7/15; H04N 7/173; H04N 13/04; H04L 12/46; H04M 3/56
See application file for complete search history.

(56) References Cited

U.S. PATENT DOCUMENTS

| | | | |
|---|---|---|---|
| 444,795 | A | 1/1891 | King |
| 5,619,378 | A | 4/1997 | Schwab |

(Continued)

FOREIGN PATENT DOCUMENTS

| | | | |
|---|---|---|---|
| JP | 2000353248 | A | 12/2000 |
| JP | 2002368762 | A | 12/2002 |

(Continued)

OTHER PUBLICATIONS

SRI Satchmo. Arjuna bird's eye'. [online]. Nov. 26, 2011. [retrieved on Jan. 24, 2014]. Retrieved from the Internet. <URL: http://srisatchmo.wordpress.com/tag/arjuna-birds-eye/>, all pages.
(Continued)

*Primary Examiner* — Xiomar L Bautista
(74) *Attorney, Agent, or Firm* — Law Office of Ira D. Blecker, P.C.

(57) ABSTRACT

A method of sharing a target object which includes: obtaining a geo location of a first user; obtaining a focus of the first user to a target object; determining a distance to the target object from the first user; determining the geo location of the target object; obtaining a geo location of a second user; transmitting the geo location of the target object to the second user; prompting the second user to focus on the target object; and displaying the target object to the second user. The method may be implemented on one or more computer devices. There is also a computer program product and a system for sharing a target object between a first user and a second user.

20 Claims, 5 Drawing Sheets

(51) Int. Cl.
  *G02B 27/01* (2006.01)
  *G09G 5/12* (2006.01)
  *G09G 3/00* (2006.01)

(52) U.S. Cl.
  CPC .............. *G09G 3/001* (2013.01); *G09G 3/003* (2013.01); *G09G 5/12* (2013.01); *G02B 2027/0178* (2013.01); *G09G 2320/10* (2013.01); *G09G 2340/0464* (2013.01); *G09G 2340/12* (2013.01); *G09G 2354/00* (2013.01)

(56) References Cited

U.S. PATENT DOCUMENTS

| | | | |
|---|---|---|---|
| 5,689,619 A | 11/1997 | Smyth | |
| 8,510,166 B2 | 8/2013 | Neven | |
| 2003/0046401 A1* | 3/2003 | Abbott | G06F 9/4443 709/228 |
| 2011/0228975 A1 | 9/2011 | Hennessey et al. | |
| 2012/0212484 A1 | 8/2012 | Haddick et al. | |
| 2012/0218186 A1* | 8/2012 | Brock, Sr. | G06T 19/003 345/163 |
| 2012/0249741 A1* | 10/2012 | Maciocci | G06F 3/011 348/46 |
| 2012/0274750 A1 | 11/2012 | Strong | |
| 2013/0293468 A1 | 11/2013 | Perez et al. | |
| 2014/0184496 A1* | 7/2014 | Gribetz | G02B 27/017 345/156 |
| 2015/0379358 A1* | 12/2015 | Renkis | G06K 9/00771 348/159 |

FOREIGN PATENT DOCUMENTS

| | | |
|---|---|---|
| JP | 3413127 B2 | 6/2003 |
| JP | 2013020422 A | 1/2013 |

OTHER PUBLICATIONS

Hyun Soo Park et al., "3D Social Saliency from Head-mounted camera", Advances in Neural Information Processing Systems (NIPS), Dec. 2012, 26, pp. 431-439.

"Google Glass: release date, news and features". [online], Nov. 7, 2013. [retrieved on Jan. 24, 2014]. Retrieved from the Internet <URL: http://www.techradar.com/news/video/google-glass-what-you-need-to-know-1078114>, all pages.

"Mutualink Unveils Google Glass for Public Safety". [online]. Aug. 19, 2013. [retrieved on Jan. 24, 2014]. Retrieved from the Internet <URL: http://www.businesswire.com/news/home/20130819005155/en/Mutualink-Unveils-Google-Glass-Public-Safety>, all pages.

"What are the advantages of having two eyes?". [online]. [retrieved on Feb. 3, 2014]. Retrieved from the Internet <URL: http://wiki.answers.com/Q/What_are_the_advantages_of_having_two_eyes>, all pages.

"Calculate distance, bearing and more between Latitude/Longitude points". [online] [retrieved on May 15, 2014]. Retrieved from the Internet <URL: http://www.movable-type.co.uk/scripts/latlong.html>, all pages.

"EasyMeasure—Measure with your Camera". [online] [retrieved on May 15, 2014]. Retrieved from the Internet <URL:https://itunes.apple.com/us/app/easymeasure-measure-your-camera!/id349530105?mt=8, all pages.

"Smart Measure". [online] [retrieved on May 15, 2014]. Retrieved from the Internet <URL:https://play.google.com/store/apps/details?id=kr.sira.measure>, all pages.

* cited by examiner

SHARING OF TARGET OBJECTS

BACKGROUND

The present invention relates to the sharing of objects between users and, more particularly, relates to a first user sharing an image of an object with a second user which may include highlighting the viewed object to the second user wherein both first user and second user have head mounted computer devices.

Head mounted devices for viewing objects are well known. One such head mounted device is Google Glass in which a pair of glasses has a video display and computer device in the frame of the glasses. The head mounted device may be used for a number of functions including taking pictures, sending images, and communicating with others by Wi-Fi or cellular technology.

Objects may be viewed by such head mounted devices. However, when a first user is viewing an object some distance away (such as a deer in the woods) and wants to point out the object to a second user, it may be difficult to explain the object and its location sufficiently so that a second user can find and view the object.

BRIEF SUMMARY

The various advantages and purposes of the exemplary embodiments as described above and hereafter are achieved by providing, according to a first aspect of the exemplary embodiments, a method of sharing a target object which includes: obtaining a geo location of a first user; obtaining a focus of the first user to a target object; determining a distance to the target object from the first user; determining the geo location of the target object; obtaining a geo location of a second user; transmitting the geo location of the target object to the second user; prompting the second user to focus on the target object; and displaying the target object to the second user.

According to a second aspect of the exemplary embodiments, there is provided a computer program product for sharing a target object. The computer program product includes a computer readable storage medium having a computer readable program code embodied therewith. The computer readable program code including: computer readable program code configured to obtain a geo location of a first user; computer readable program code configured to obtain a focus of the first user to a target object; computer readable program code configured to determine a distance to the target object from the first user; computer readable program code configured to determine the geo location of the target object; computer readable program code configured to obtain a geo location of a second user; computer readable program code configured to transmit the geo location of the target object to the second user; computer readable program code configured to prompt the second user to focus on the target object; and computer readable program code configured to display the target object to the second user.

According to a third aspect of the exemplary embodiments, there is provided a system for sharing a target object between a first user and a second user which includes a head mounted device having a video display and a computer device. The computer device having a computer readable storage medium, the computer readable storage medium having program code embodied therewith. The computer readable program code including: computer readable program code configured to obtain a geo location of the first user; computer readable program code configured to obtain a focus of the first user to a target object; computer readable program code configured to determine a distance to the target object from the first user; computer readable program code configured to determine the geo location of the target object; computer readable program code configured to obtain a geo location of the second user; computer readable program code configured to transmit the geo location of the target object to the second user; computer readable program code configured to prompt the second user to focus on the target object; and computer readable program code configured to display the target object to the second user.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
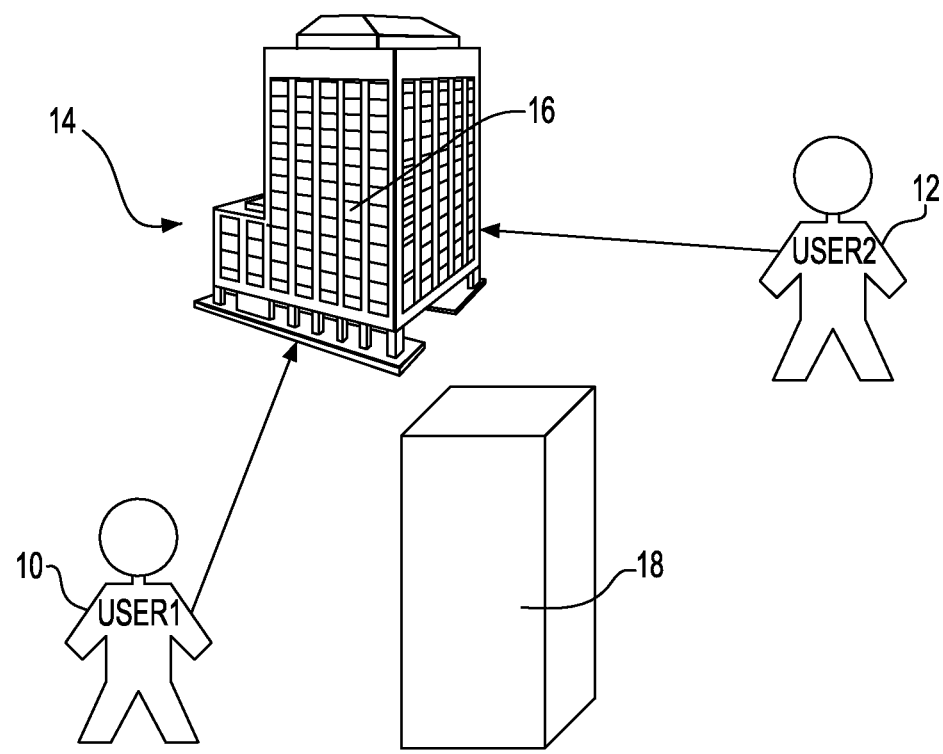
FIG. 1 is an illustration of two users looking at a building.

Referring to the Figures in more detail, and particularly referring to FIG. 1, there is illustrated a pair of users, user1 10 and user2 12, looking at a scene such as a building 14. User1 10 is particularly focusing on object 16, such as a part of building 14, and sees something interesting that user1 10 would like to share with user2 12. Since user2 12 may not be nearby user1 10 and in fact may be separated from user1 10 by an obstacle such as another building 18, it may be difficult to communicate to user2 12 what user1 10 is seeing. As much as user1 10 tries to describe the object 16 to user2 12, it is difficult to get user2 12 to focus on the object 16 (or perhaps even a part of object 16) that user1 10 is focusing on.

It would be desirable to have a way for user1 10 to show user2 12 what user1 10 is focusing on even though user1 10 and user2 12 may be separated by distance and/or obstacles.

The present inventor proposes exemplary embodiments in which user1 10 and user2 12 each wear a head mounted device such that user1 10 can focus on an object (such as object 16 in FIG. 1) and communicate the locus of user1 10 to user2 12 so that both user1 10 and user2 12 may focus on the same object. The head mounted device may be any head mounted device such as Google Glass, Looxcie, iOptik or Goldeni, just to name a few.

Figure 2:
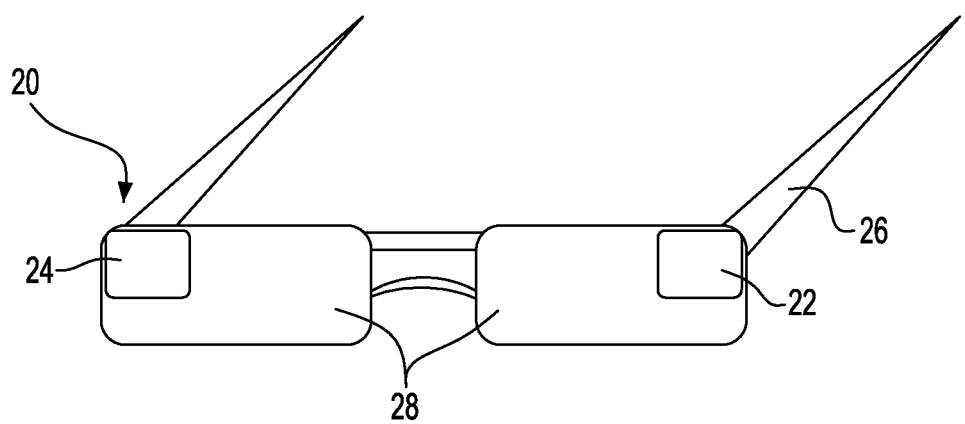
FIG. 2 is an illustration of a head mounted device that is useful for the exemplary embodiments.

Referring now to FIG. 2, there is shown an illustration of a head mounted device 20 that may be used in the exemplary embodiments. It should be understood that head mounted device 20 shown in FIG. 2 is only meant for purposes of illustration and not limitation and that other head mounted devices may serve the purposes of the exemplary embodiments provided these other head mounted devices have the functions and capabilities described herein.

Head mounted device 20 may include a video display 22 for the left eye and a video display 24 for the right eye. Included within the frame 26 of the head mounted device 20 may be one or more computer devices (not shown in FIG. 2). Head mounted device 20 may or may not have lenses 28 which may or may not be prescription lenses.

Figure 3:
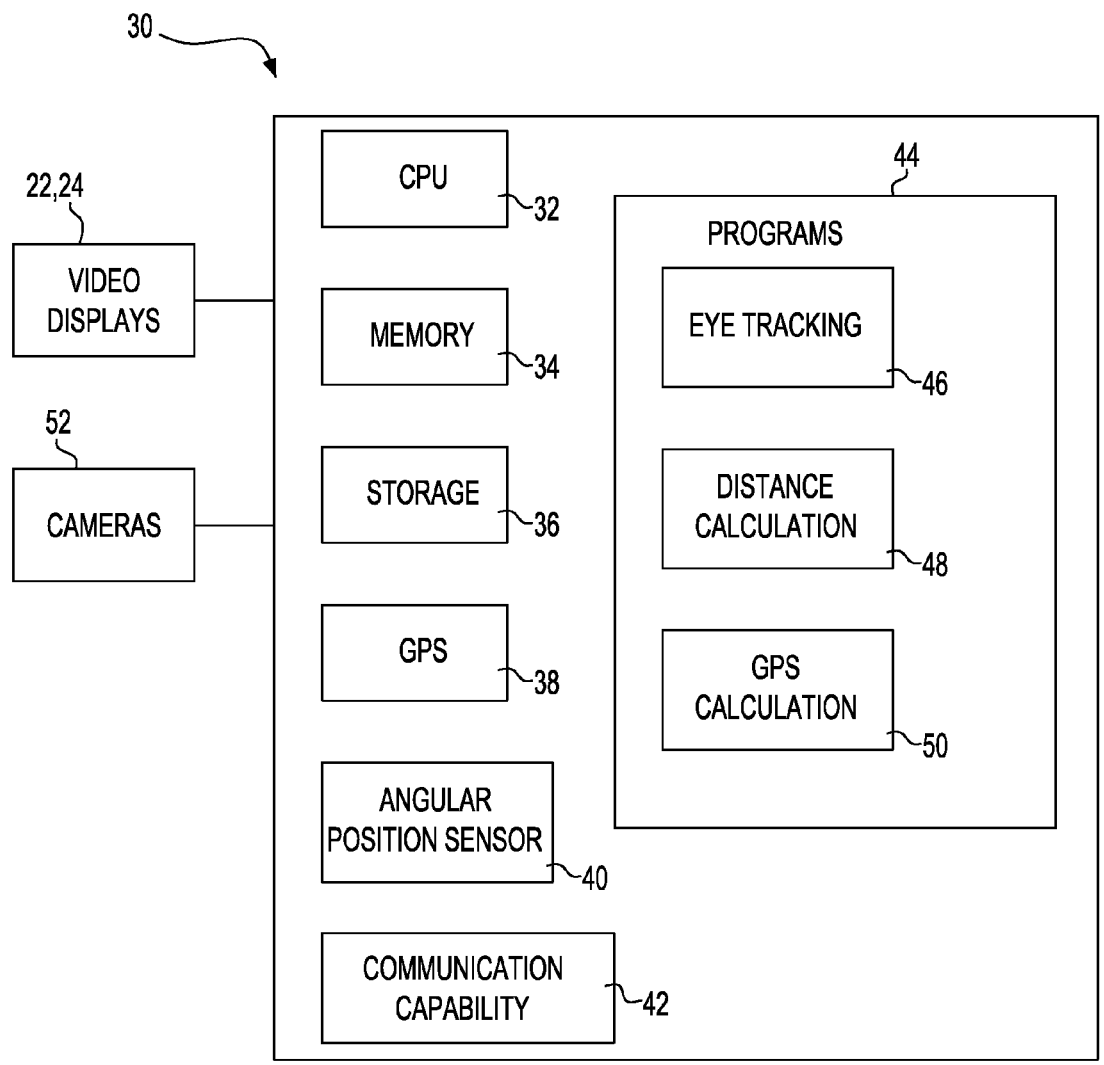
FIG. 3 is a block diagram of a computer device that may be resident in the head mounted computer device of FIG. 2.

Referring now to FIG. 3, there is shown a block diagram of a computer device 30 that may be present in head mounted device 20. Computer device 30 may include a central processing unit (CPU) 32, memory 34 and storage 36, such as solid state storage. While storage 36 is shown as within computer device 30, storage 36 may alternatively be cloud storage (i.e., storage on a remote server which may be connected to the head mounted device 20 by a network such as the internet via cellular or Wi-Fi capability in the head mounted device 20). In addition, the computer device 30 may have a Global Positioning System (GPS) 38 and an angular position sensor 40, such as a digital compass, for determining the angular position of the head mounted device 20. It is preferred that the head mounted device 20 have communication capability, indicated by box 42, to communicate with other head mounted devices. The communication capability may include Wi-Fi, cellular and even satellite capability.

The computer device 30 may, in addition, have certain applications or programs 44 resident in the computer device 30. These applications or programs 44 may include eye tracking 46 of the user of the head mounted device 20, distance calculation 48 to a target object and GPS calculation 50 to calculate, for example, the distance and bearing between two GPS locations or determining the GPS location of the target object. It should be understood that it is within the scope of the exemplary embodiments for these applications or programs 44 to be accessible remotely by the internet or in cloud storage.

The computer device 30 may be connected to video screens 22, 24 shown in FIG. 2. In addition, the computer device 30 may be connected to one or more cameras 52 (not shown in FIG. 2) that may be present in the head mounted device 20. The cameras 52 may be facing toward user1 10 to catch eye movements (described hereafter) or facing away from user1 10 or both.

Figure 4:
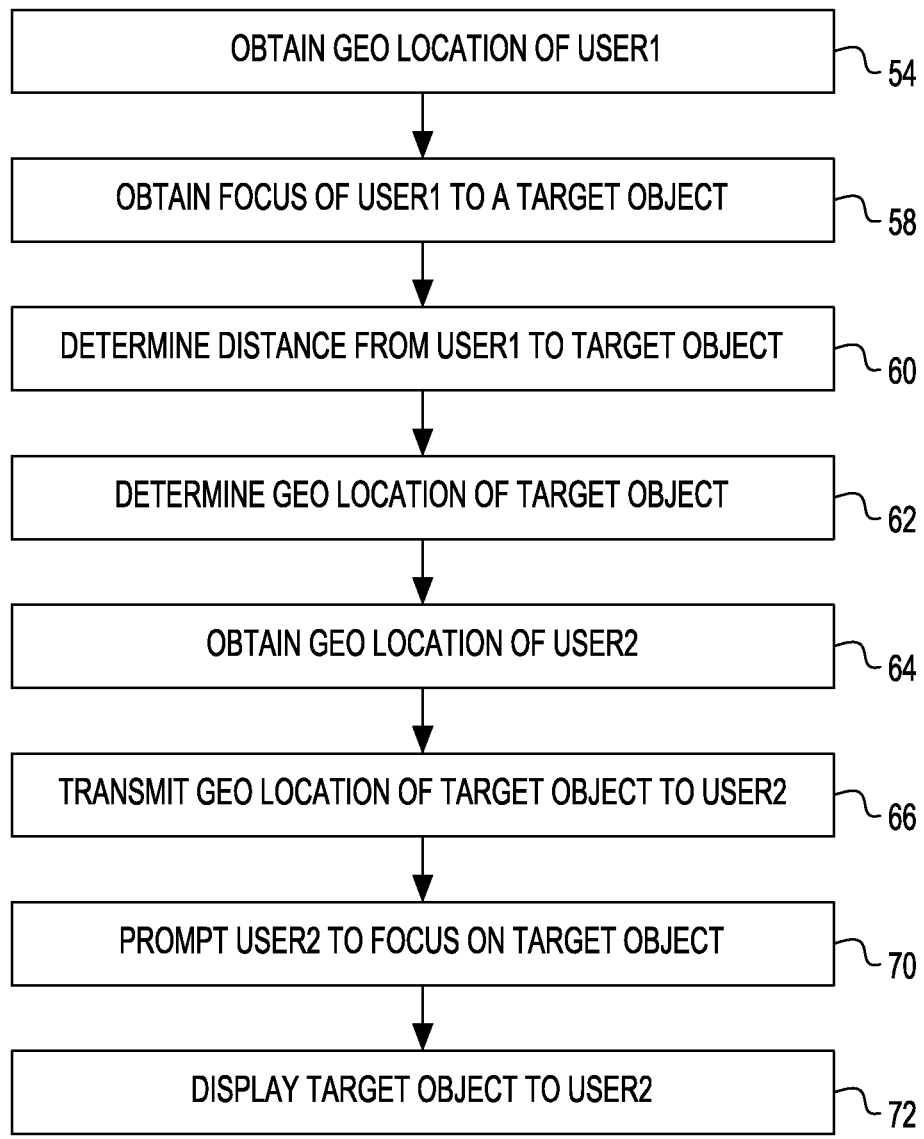
FIG. 4 is a flow chart illustrating an exemplary embodiment.
Figure 5:
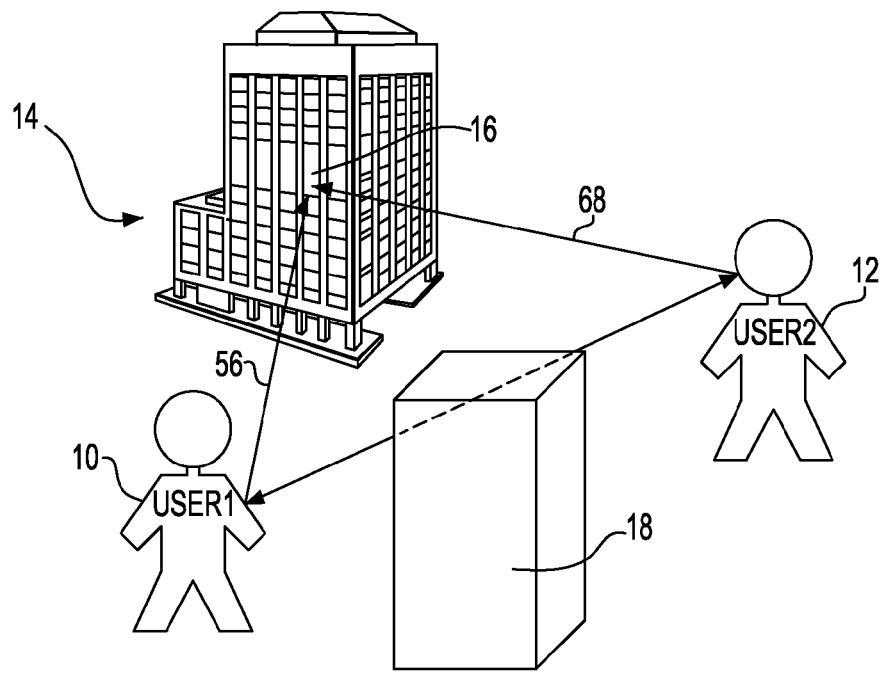
FIG. 5 is an illustration of two users looking at a target object according to an exemplary embodiment.

In one exemplary embodiment, a first user may focus on a target object and provide an image of that target object to a second user. Referring now to FIGS. 3, 4 and 5, the geo location of user1 10 is obtained by GPS 38 in computer device 30, box 54 of FIG. 4. Geo location is the identification of the real-world geographic location of an object or person. Next, the focus (56 in FIG. 5) of user 1 10 to the target object 16 may be obtained by eye tracking of user1 10, box 58 of FIG. 4, in conjunction with the compass bearing of user1's head. The angular position of the head of user1 10 to the target object 16 may be registered by the angular position sensor 40 in computer device 30. In addition, the gaze of user1 10 toward target object 16 may be obtained through eye tracking of the user1 10.

In order to determine the focus of user1 10 to the target object 16, it may be necessary to obtain both the angular position of the head of user1 10 to the target object 16 as well as the gaze of user1 10 to the target object 16. That is, both the direction of looking (i.e., angular position of the head of the user) as well as the target object looked at (i.e., gaze of user) may be necessary.

Figure 6:
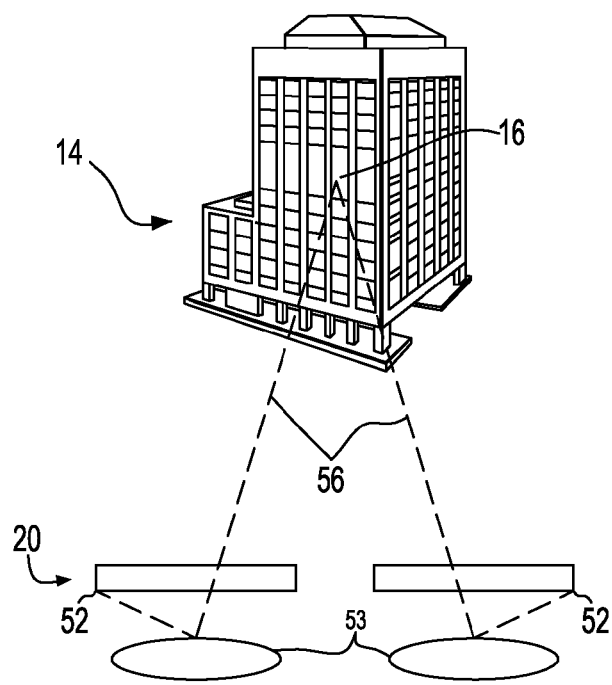
FIG. 6 is an illustration of one method of eye tracking that may be used in the exemplary embodiments.

Eye tracking is a well known technique for determining the point at which a user may be focusing on. One method of eye tracking is illustrated in FIG. 6 where cameras 52 in the head mounted device 20 may register eye movements 53 of the user1 10 as the user focuses on the target object 16. These eye movements 53 may be converted to a user's gaze by eye tracking application 46.

It should be understood that "target object" may not be the entire field of view of user1 10 but an object or even part of an object within the field of view. For example, the target object may be a building or a portion of the building.

Once the user1 10 has focused on the target object 16, the distance between user1 10 and the target object 16 may be determined, box 60 of FIG. 4, by various means. In one means, the user1 10 may use the cameras 52 in the head mounted device 20 in conjunction with an application, such as application 48 in computer device 30, that calculates distance from the camera views. Another means is to have a range finder integrated within head mounted device 20 or separate from head mounted device 20 to determine the distance between user1 10 and target object 16.

Thereafter, as described in box 62 of FIG. 4, the geo location of the target object 16 may be determined (i.e., calculated) such as by GPS calculation application 50 in computer device 30.

At this point, user1 10 may decide to share target object 16 with user2 12. In order to do this, user1 10 may need to know user2's geo location.

The geo location of user2 12 is obtained, box 64 of FIG. 4. Since user2 12 is also wearing a head mounted device with GPS and communication capability, the GPS in the head mounted device of user2 12 obtains the geo location of user2 12 and provides it to user1 10 through the communication capability of the head mounted device of user2 12. The computer device 30 in user1's head mounted device 20 may be programmed to obtain user2's geo location once user 1 selects user2 for sharing. Alternatively, user1 10 may through a user interface in head mounted device 20 or a gesture recognized by head mounted device 20 specifically request the computer device 30 to communicate with user2's computer device to obtain user2's geo location.

Once the geo location of user2 12 is obtained, user1's computer device 30 through communication capability 42 transmits the geo location of the target object 16 to user2's computer device, box 66 of FIG. 4. The direction 68 (FIG. 5) that user2 12 should turn may also be sent to user2 12 by user1's computer device 30. When user1's computer device 30 communicates with user2's computer device, there may also be a message sent to user2 12 to focus on the target object. User2 12 may be prompted to focus on the target object 16, box 70 of FIG. 4. The prompting may occur in a number of ways. In one way, the transmission of the geo location of the target object 16 (and possibly also by the direction 68) to user2 12 may prompt user2 12 to focus on the target object 16. In another way, the message sent to user2 12 may prompt user2 12 to focus on the target object 16. Other ways are also contemplated within the scope of the exemplary embodiments.

Lastly, the target object 16 may be displayed to user2 12, box 72 of FIG. 4, such as in user2's head mounted device.

Since user1's computer device 30 knows the geo location of user2's location and the geo location of the target object 16, user1's computer device 30 may in addition calculate the distance between the geo location of user2's location and the geo location of the target object 16 using application 48 in user1's computer device 30 and provide this distance to user2 12 to help user2 12 locate the target object 16.

Again, user1 10 and user2 need not be nearby one another and in fact, user1 10 and user2 12 may be separated by an obstacle such as building 18 as shown in FIG. 5.

Figure 7:
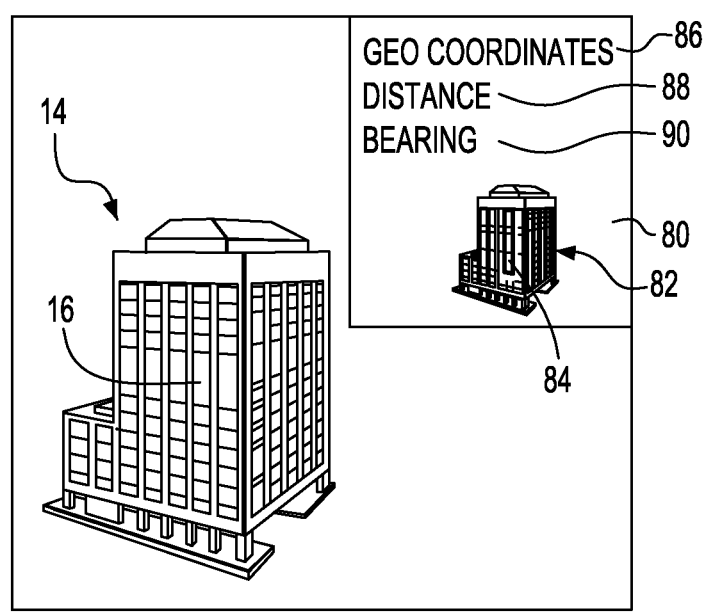
FIG. 7 is an illustration of a view through one of the lenses of the head mounted device of FIG. 2.

Referring to FIG. 7, there is shown the view from user2's head mounted device. In user2's video display 80, there may be displayed the plurality of objects 82 and particularly the target object 84. Most preferably, the target object 84 has been highlighted in the video display 80 so as to make it easier for user2 12 to see. In the most preferred exemplary embodiment, user2 12 may be prompted to view a target object 16 that is viewed by user1 10 and also have the target object 16 highlighted in user2's video display 80 so that user2 may more easily view the target object 16.

The video display 80 may also display the geo coordinates 86 of the target object 84, distance 88 to the target object and the bearing 90 (or direction) that user2 12 must turn to see the target object 84. Also shown in FIG. 7 is the real view of the plurality of objects 14 and target object 16. The user2 12 may use the video display of the target object 84 to focus (68 in FIG. 5) on the target object 16.

If it turns out that the target object 16 is not in user2's field of view, user2 12 may be prompted by user1's computer device 30 or other means to change locations so that the target object 16 may then be in user2's field of view.

In one exemplary embodiment, the target object 16 may be shown (and preferably highlighted) to user2 12 as target object 84 in the video display 80 only when the target object 16 is in user2's field of view. In another, preferred exemplary embodiment, the target object 16 may always be shown (and most preferably highlighted) to user2 12 as target object 84 in the video display 80 even if the target object 16 is in not in user2's field of view.

The exemplary embodiments may be further useful in instances where user1 10 and/or the target object 16 is moving (i.e., not stationary). In other exemplary embodiments, all of the target object 16, user1 10 and user2 12 may be moving.

While the exemplary embodiments have been discussed with respect to only user2 12, it should be understood that user1 10 may share and highlight the viewed target object 16 with additional users.

The exemplary embodiments also include system for sharing a target object between a first user and a second user. The system may include a head mounted device having a video display and a computer device. The computer device may have a computer readable storage medium, the computer readable storage medium having program code embodied therewith, the computer readable program code performs the method of FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of sharing a target object between a first user wearing a first head mounted device and a second user wearing a second head mounted device, comprising:
    obtaining by the first head mounted device a geo location of the first user;
    obtaining by the first head mounted device a focus of the first user to a physical target object;
    determining by the first head mounted device a distance to the physical target object from the first user;
    determining by the first head mounted device the geo location of the physical target object;
    obtaining by the first head mounted device a geo location of the second user;
    transmitting by the first head mounted device the geo location of the physical target object to the second user;
    prompting by the first head mounted device the second user to focus on the physical target object; and
    displaying by the first head mounted device a picture of the physical target object to the second user in the second head mounted device;
    wherein the method is implemented on one or more computer devices.

2. The method of claim 1 wherein displaying by the first head mounted device a picture of the physical target object further includes highlighting by the first head mounted device, in the picture of the physical target object, the physical target object to the second user.

3. The method of claim 2 further comprising: determining when the second user is in a field of view to view the physical target object and when the second user is not in the field of view, prompting by the first head mounted device the second user to move to a different location to be within the field of view; and
    highlighting by the first head mounted device, in the picture of the physical target object, the physical target object to the second user.

4. The method of claim 3 further comprising providing by the first head mounted device a bearing for the second user to focus on the physical target object.

5. The method of claim 1 wherein there is at least one additional second user for which the processes of obtaining by the first head mounted device the geo location of the second user, transmitting by the first head mounted device the geo location of the physical target object to the second user, prompting by the first head mounted device the second user and displaying by the first head mounted device the picture of the physical target object to the second user are repeated for the at least one additional second user.

6. The method of claim 1 further comprising providing by the first head mounted device a bearing for the second user to focus on the physical target object.

7. The method of claim 1 further comprising determining by the first head mounted device a distance between the second user and the physical target object and providing the distance between the second user and the physical target object to the second user.

8. The method of claim 1 further comprising prompting by the first head mounted device the second user to change location so as to have the physical target object in the second user's field of view.

9. The method of claim 1 wherein the physical target object is not stationary.

10. The method of claim 1 wherein the physical target object and the first user are not stationary.

11. The method of claim 1 wherein the physical target object, the first user and the second user are not stationary.

12. The method of claim 1 wherein the physical target object is only part of a field of view of the first user.

13. A computer program product for sharing a target object, the computer program product comprising:
    a computer readable storage medium having a computer readable program code embodied therewith, the computer readable program code executable by a processor in a first head mounted device of a first user to perform a method comprising:
    obtaining a geo location of the first user;
    obtaining a focus of the first user to a physical target object;
    determining a distance to the physical target object from the first user;
    determining the geo location of the physical target object;
    obtaining a geo location of a second user;

transmitting the geo location of the physical target object to the second user;

prompting the second user to focus on the physical target object; and displaying a picture of the physical target object to the second user.

14. The computer program product of claim 13 wherein displaying the physical target object further includes highlighting, in the picture of the physical target object, the physical target object to the second user.

15. The computer program product of claim 13 wherein the computer readable program code executable by the processor in the first head mounted device of the first user to perform the method further comprising:

determining when the second user is in a field of view to view the physical target object and when the second user is not in the field of view, prompting the second user to move to a different location to be within the field of view; and highlighting, in the picture of the physical target object, the physical target object to the second user when the physical target object is in the second user's field of view.

16. The computer program product of claim 13 wherein the computer readable program code executable by the processor in the first head mounted device of the first user to perform the method further comprising providing a bearing for the second user to focus on the physical target object.

17. The computer program product of claim 13 wherein the computer readable program code executable by the processor in the first head mounted device of the first user to perform the method further comprising determining a distance between the second user and the physical target object and providing the distance between the second user and the physical target object to the second user.

18. A system for sharing a target object between a first user and a second user, comprising:

a head mounted device having a video display and a computer device;

the computer device having a computer readable storage medium, the computer readable storage medium having program code embodied therewith, the computer readable program code comprising:

computer readable program code configured to obtain a geo location of the first user;

computer readable program code configured to obtain a focus of the first user to a physical target object;

computer readable program code configured to determine a distance to the physical target object from the first user;

computer readable program code configured to determine the geo location of the physical target object;

computer readable program code configured to obtain a geo location of the second user;

computer readable program code configured to transmit the geo location of the physical target object to the second user;

computer readable program code configured to prompt the second user to focus on the physical target object; and computer readable program code configured to display a picture of the physical target object to the second user.

19. The system of claim 18 wherein computer readable program code configured to display the physical target object further includes computer readable program code configured to highlight, in the picture of the physical target object, the physical target object to the second user.

20. The system of claim 18 further comprising: computer readable program code configured to determine when the second user is in a field of view to view the physical target object and when the second user is not in the field of view, computer readable program code configured to prompt the second user to move to a different location to be within the field of view; and computer readable program code configured to highlight, in the picture of the physical target object, the physical target object to the second user when the physical target object is in the second user's field of view.

* * * * *